United States Patent [19]

Parfree et al.

[11] 4,262,913
[45] Apr. 21, 1981

[54] HIGH PRESSURE GLAND FOR OPTICAL FIBRES AND/OR ELECTRICAL CONDUCTORS

[75] Inventors: Colin S. Parfree, Harlow; Duncan A. Gunn, Saffron Walden; John C. Crownshaw, Bishop's Stortford, all of England

[73] Assignee: International Standard Electric Corporation, New York, N.Y.

[21] Appl. No.: 71,469

[22] Filed: Aug. 31, 1979

[30] Foreign Application Priority Data

Sep. 7, 1978 [GB] United Kingdom ............. 35915/78

[51] Int. Cl.³ .................... H02G 15/04; F16J 15/12
[52] U.S. Cl. ......................................... 277/1; 277/4; 277/12; 174/23 R; 174/65 SS; 174/76; 174/77 R
[58] Field of Search .................. 277/4, 12, 1, 9, 5; 174/65 SS, 116, 23 R, 76, 77 R, 98, 151

[56] References Cited

U.S. PATENT DOCUMENTS

| 3,104,277 | 9/1963 | Bossu | 277/4 X |
|---|---|---|---|
| 3,290,427 | 12/1966 | Newcomer | 277/4 X |
| 3,739,076 | 6/1973 | Schwartz | 174/65 SS X |
| 3,781,456 | 12/1973 | Knowles et al. | 277/1 X |
| 4,015,329 | 4/1977 | Hutchinson | 174/76 X |
| 4,103,136 | 7/1978 | Karakis et al. | 277/4 X |
| 4,152,538 | 5/1979 | Gassinger et al. | 174/23 R X |

FOREIGN PATENT DOCUMENTS

| 849268 | 8/1939 | France | 174/65 |
|---|---|---|---|
| 1473304 | 2/1967 | France | 174/151 |
| 769452 | 3/1957 | United Kingdom | 277/4 |
| 889080 | 2/1962 | United Kingdom | 174/76 |
| 916224 | 1/1963 | United Kingdom | 174/65 SS |

Primary Examiner—Robert S. Ward, Jr.
Attorney, Agent, or Firm—John T. O'Halloran

[57] ABSTRACT

A high pressure gland for optical fibres and/or electrical conductors has a tubular member through which the fibres/conductors are loosely passed. The bore of the tube is then filled with an encapsulating plastics material which adheres to both the fibres/conductors and the wall of the tube bore. The outside of the tubular member is shaped so as to be mechanically secured and sealed in an aperture in a bulkhead or the like. The construction of the gland is such that it can withstand a high axial pressure differential such as might be experienced on the sea bed.

9 Claims, 2 Drawing Figures

HIGH PRESSURE GLAND FOR OPTICAL FIBRES AND/OR ELECTRICAL CONDUCTORS

This invention relates to high pressure glands for optical fibres and/or electrical conductors.

BACKGROUND OF THE INVENTION

When optical fibres and/or electrical conductors are required to pass through a bulkhead separating a high pressure environment from a low pressure environment, for example up to 15000 psi (104 $MN.m^{-2}$) on the high pressure side and atmospheric or near atmospheric pressure on the low pressure side, high axial loads are generated in the fibres and conductors.

A particularly difficult environment exists for a submarine telecommunications system in which the transmission of information is accomplished with a transmission cable and amplifiers at spaced apart locations along the cable to amplify the information signals, thus compensating for the loss caused by the cable. Such an amplifier is housed in a strong watertight housing and a bulkhead seals each end of the housing. The cable passes through a gland in this bulkhead and the gland forms a watertight seal between the cable and the bulkhead.

With conventional submarine telecommunication systems utilising polythene sheathed coaxial electric cables, the sealing of the cable to the bulkhead has been achieved by providing on the bulkhead an integral hollow castellated spigot, passing the cable through the hollow spigot and the bulkhead and moulding polyethylene around the spigot and the cable sheath. The dielectric between the inner and outer conductor of the coaxial cable is formed of solid low-loss polythene, and in the event of a cable break adjacent the repeater, caused for example by a dragged ship anchor, the chance of water passing along the inside of the broken cable into the repeater is remote.

SUMMARY OF THE INVENTION

According to the present invention there is provided a high pressure gland for optical fibres and/or electrical conductors comprising a tubular strength member through which the fibres and/or conductors are loosely passed, the remaining space in the bore of the tube being filled with an encapsulating plastics material which adheres to both the wall of the bore and the fibres and/or conductors, the tube being adapted to be mechanically secured with pressure seals through an aperture in a bulkhead or the like, the gland being able to withstand a high axial pressure differential.

Preferably the tubular strength member comprises a first tubular part secured to and through a second tubular part with moulded plastics material, the second tubular part being adapted to be mechanically secured through the aperture.

According to another aspect of the present invention there is provided a method of forming a high pressure gland for sealing and securing an optical fibre and/or electric conductor through an aperture in a bulkhead, comprising providing a tubular strength member, feeding the optical fibres and/or electrical conductors through the member, introducing an encapsulating plastics material in the remaining space in the interior of the member which adheres to both the wall of the bore and the fibres and/or conductors and securing the member through the aperture in the bulkhead with pressure seals, the gland being such that it can withstand a high axial pressure differential.

BRIEF DESCRIPTION OF THE DRAWINGS

In order that the invention can be clearly understood reference will now be made to the accompanying drawings in which.

DETAILED DESCRIPTION OF THE PREFERRED EMBODIMENTS

Figure 1:
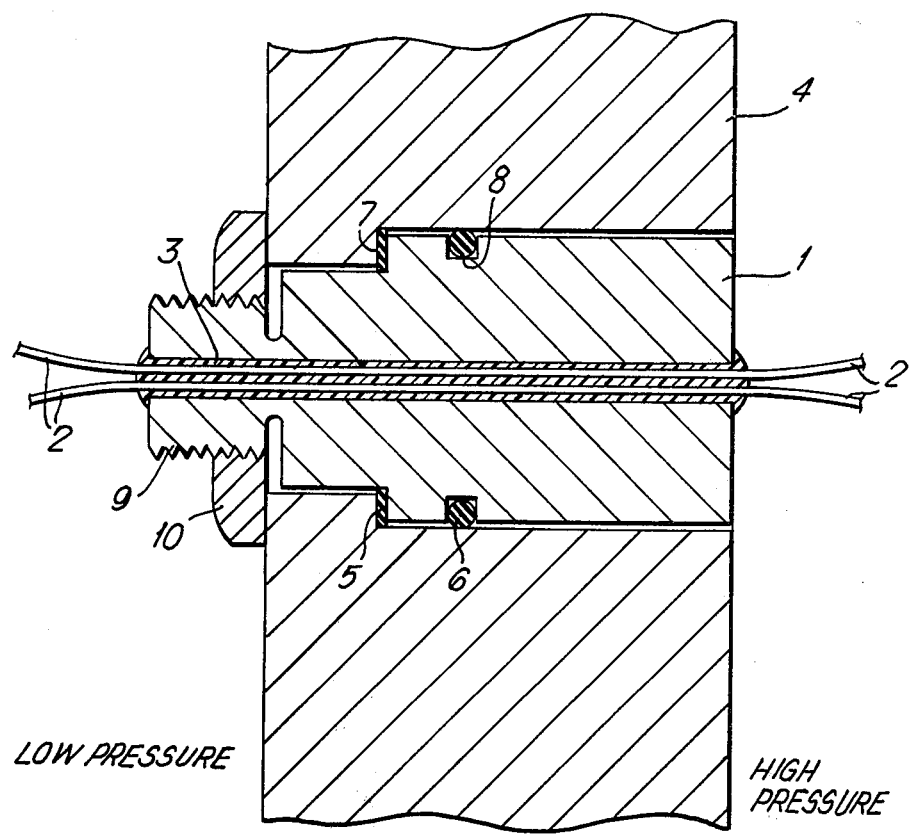
FIG. 1 is a schematic cross-section through a high pressure gland according to one embodiment of the invention and FIG. 2 is a cross-section through a high pressure gland according to another embodiment and adapted for use in a submersible repeater for an optical submarine telecommunication system.

Referring to FIG. 1, the gland has a tubular strength member 1 for example made of copper, through which are passed the optical fibres or conductors 2. The bore 3 of the member 1 is then filled with an encapsulating plastics material, such as an epoxy resin, which adheres to both the fibres/conductors and the bore wall. The outer surface of the member 1 is shaped so that it can be mechanically secured and sealed in the bulkhead 4. Thus it is provided with annular shoulders 5 and grooves 6 which accommodate sealing rings 7,8. One end of the member 1 is provided with a threaded portion 9 which engages a clamping nut 10. The design of the gland results in the high axial fibre/conductor load generated by the hydrostatic stress being transferred to the wall of the surrounding member via the encapsulating material. This results in a component which is efficient in operation, does not affect optical fibre transmission and is cheap to manufacture. The strength member can also be made of other materials, e.g. aluminium or steel.

The embodiment just described is a simplified arrangement for a submersible repeater although such details as provision for separate electric power transmission and strength members for protecting the fibres where they emerge have been omitted.

Figure 2:
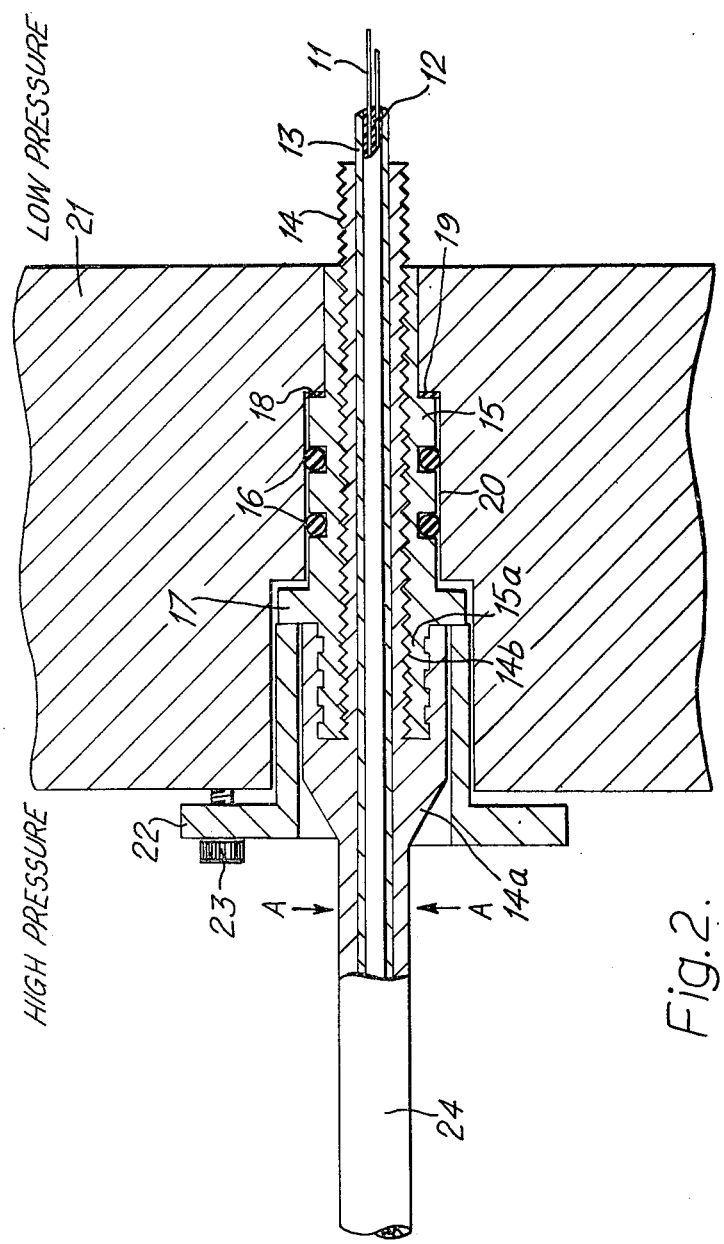

Referring now to FIG. 2 of the drawings optical fibres 11 extend through an inner tubular part formed by a copper tube 13. The remaining space in the bore of the copper tube is filled with an encapsulating plastics material 12, preferably a cold-setting resin. The copper tube is sheathed in extruded plastics insulating material 14, preferably polyethylene. The sheathed copper tube is secured through a second tubular part 15 by means of injection-moulded plastics material 14a, again preferably polythene, which forms a tapered moulded joint around a castellated tubular spigot 15a of the part 15. The moulded plastics material also permeates the interstices between the plastics sheath 14 and an internal screw thread 14b of the part 14, thus forming a strong mechanical lock between the parts 13 and 15 able to withstand high axial forces.

The part 15 has annular grooves 16 housing O-ring seals and a radial flange 17. Part 15 is seated on a lead seal 18 on a shoulder 19 in an aperture 20 in a bulkhead 21.

A gland retaining ring 22 with clamping bolts 23 (only one of which is shown) holds the gland in place and partially compresses the lead seal 18. In use, external water pressure will intensify the pressure on seal 18 at maximum sea depths, at pressures such as 1000 bar.

The end portion 24 of the sheathed tube 13 extends for about a meter to a point (not shown) where it is joined to an optical fibre tail cable extending from the main cable which is anchored (not shown) to the repeater housing (not shown). Alternatively it may be joined directly to the main cable.

It is envisaged that the main cable will be prepared with a length (a few meters) of optical fibres extending from a smaller diameter tail, beyond a point at which the main cable will be anchored to the repeater.

The fibres will then be passed through the length of sheathed tubing (13,14) and the tubing connected to the end of the tail. The part 15 will then be secured to the sheath 14 by an injection moulding process. Then a predetermined quantity of cold-setting resin is injected into the bore of the tube 13 from its remaining open end (using for example a hyperdermic syringe) to fill the remaining space to a point just beyond the end of the tapered moulding 14a (arrows A—A). After this has set the fibres are connected to a regenerator (amplifier) within the housing (not shown) and the gland is then secured and sealed to the bulkhead by means of the retaining ring 22, bolts 23, and the lead and elastomeric seals 18 and 16 respectively. This may be before or after the bulkhead 21 is secured and sealed in place in the housing.

In this embodiment for a submarine system the copper tube 13 carries electrical power for powering the repeater (termed a regenerator in an optical system) and would be connected to a power receiving/supplying lead inside the repeater. The system could be bi-directional insofar as the optical information signals are concerned, but uni-directional for the electrical power supply.

Although it has not been mentioned specifically above when the gland is used with optical fibres it may be necessary for the fibre coating to have some surface preparation to achieve the required bond strengths. In each case the nature of this surface treatment will depend upon the choice of the plastics encapsulant used.

In both embodiments the bore is relatively small (approximately 6 mm) and the length over which the epoxy resin extends is of the order of 15 cms.

In the second embodiment the plastics insulation 14 has a diameter of about 12 mm. The bulkhead 21 has a thickness of just under 10 cms.

What is claimed is:

1. A high pressure gland inserted through an aperture of a submarine bulkhead for a telecommunication cable comprising:
    a plurality of conductors,
    an inner tubular strength member enclosing said conductors and extending through said gland,
    an encapsulating plastic material in said inner tubular member which adheres to both the wall of the bore and the conductors,
    a sheathing surrounding said inner tubular member,
    a second tubular member secured to the outside of said sheathing by means of an injection moulded plastic material, said injection moulded plastic material forming a tapered joint around said second tubular member, said second tubular member having at least one annular groove, a radial flange and a first shoulder section, O-ring seals disposed in said annular grooves, said submarine bulkhead comprising a second shoulder section,
    a compressible seal disposed between said first shoulder and said second shoulder sections, and
    a gland retaining ring having clamping bolts for securing said gland to said bulkhead and applying pressure to said compressible seal.

2. A gland according to claim 1 wherein the encapsulating material is an epoxy resin.

3. A gland according to claim 1 or 2 in which the tubular inner strength member is made of metal.

4. A gland as claimed in claim 1, wherein said inner tubular member comprises an elongate metal tube having a sheathing of extruded plastic material thereon, the metal tube forming an electrical conductor for supplying electrical energy through the bulkhead and forming also a pressure-resistant sheath around the conductors.

5. A gland as claimed in claim 2 wherein the tubular strength member comprises a first tubular part secured to and through a second tubular part with moulded plastics material, the second tubular part being adapted to be mechanically secured through the aperture.

6. A method of forming a high pressure gland for sealing and securing at least one conductor through an aperture in a bulkhead comprising:
    providing an inner tubular strength member enclosing said conductor and extending through said gland,
    introducing an encapsulating plastic material into said inner tubular member which adheres to both the wall of the bore and the conductor,
    placing a sheathing around said inner tubular member,
    providing a second tubular member secured to the outside of said sheathing by means of an injection moulded plastic material, said injection moulded plastic material forming a tapered joint around said second tubular member, said second tubular member having at least one annular groove, a radial flange and a first shoulder section, O-ring seals disposed in said annular grooves, said bulkhead comprising a second shoulder section,
    inserting a compressible seal between said first shoulder and said second shoulder sections, and
    providing a gland retaining ring having clamping bolts for securing said gland to said bulkhead and applying pressure to said compressible seal.

7. A method as claimed in claim 6, wherein the encapsulating plastic material is an epoxy resin.

8. A method as claimed in claim 6 comprising preparing a cable end leaving a length of optical fibre projecting, feeding the length of fibre through the member, and sealing the fibre through the member with said encapsulating plastics material.

9. A method of sealing and securing a conductor through an aperture in a conductive bulkhead comprising providing an elongate conductive tube, preparing a cable end to leave said conductor projecting, passing the conductor through the tube, introducing a quantity of encapsulating plastic material in the remaining space between the bore of the tube and the conductor which adheres to both the wall of the bore and the conductor, securing the tube through a gland body, and mechanically securing the gland body with pressure seals through the aperture in the bulkhead, the tube being electrically insulated from the bulkhead.

* * * * *